United States Patent
Gerphagnon

(10) Patent No.: US 12,436,866 B2
(45) Date of Patent: Oct. 7, 2025

(54) PREDICTION OF AN ANOMALY OF A RESOURCE FOR PROGRAMMING A CHECKPOINT

(71) Applicant: BULL SAS, Les Clayes-sous-bois (FR)

(72) Inventor: Jean-Olivier Gerphagnon, Vif (FR)

(73) Assignee: BULL SAS, Les Clayes-sous-Bois (FR)

(*) Notice: Subject to any disclaimer, the term of this patent is extended or adjusted under 35 U.S.C. 154(b) by 88 days.

(21) Appl. No.: 18/356,183

(22) Filed: Jul. 20, 2023

(65) Prior Publication Data
US 2024/0037014 A1 Feb. 1, 2024

(30) Foreign Application Priority Data
Jul. 28, 2022 (EP) .................................. 22306125

(51) Int. Cl.
*G06F 11/00* (2006.01)
*G06F 11/3604* (2025.01)
*G06N 5/022* (2023.01)

(52) U.S. Cl.
CPC ......... *G06F 11/3608* (2013.01); *G06N 5/022* (2013.01)

(58) Field of Classification Search
CPC ............ G06F 11/3608; G06F 11/1438; G06F 11/008; G06N 5/022
USPC ..................................................... 714/1–57
See application file for complete search history.

(56) References Cited

U.S. PATENT DOCUMENTS

| | | | |
|---|---|---|---|
| 7,634,687 B2 * | 12/2009 | Haselden | G06F 11/0706 714/15 |
| 11,627,033 B2 * | 4/2023 | Umakanth | H04L 43/0823 709/224 |
| 11,687,391 B2 * | 6/2023 | Porwal | G06F 11/0751 714/755 |
| 2002/0087913 A1 * | 7/2002 | Harper | G06F 11/3433 714/15 |
| 2010/0011254 A1 | 1/2010 | Votta et al. | |
| 2015/0193720 A1 * | 7/2015 | Uthra | G06Q 10/063112 705/7.14 |
| 2015/0254125 A1 * | 9/2015 | Kakui | G06F 11/008 714/47.3 |
| 2016/0110268 A1 * | 4/2016 | Sekiguchi | G06F 11/1456 714/15 |
| 2016/0188393 A1 * | 6/2016 | Zamani | G06F 11/008 714/47.3 |
| 2021/0026725 A1 | 1/2021 | Roy et al. | |
| 2022/0229805 A1 * | 7/2022 | Chakeres | G06F 11/2094 |

(Continued)

OTHER PUBLICATIONS

European Search Report and Written Opinion issued in EP22306125.0, dated Jan. 5, 2023.

(Continued)

*Primary Examiner* — Sarai E Butler
(74) *Attorney, Agent, or Firm* — ARC IP Law, PC; Joseph J. Mayo

(57) ABSTRACT

The invention relates to a computer-implemented method for programming a checkpoint of at least one application executed on a computing infrastructure. The computing infrastructure includes a plurality of resources allocated to the execution of the application. The method includes determining a date of failure of the application as a function of a prediction of an anomaly of at least one resource of the plurality of resources, and programming the checkpoint as a function of the date of failure.

15 Claims, 1 Drawing Sheet

(56) References Cited

U.S. PATENT DOCUMENTS

| | | | |
|---|---|---|---|
| 2023/0026712 A1* | 1/2023 | Noorudheen | G06F 11/073 |
| 2023/0297453 A1* | 9/2023 | Viclizki | G06N 3/045 |
| | | | 714/47.2 |
| 2023/0305933 A1* | 9/2023 | Deshpande | G06F 11/1469 |
| 2023/0325254 A1* | 10/2023 | Hasti | G06F 9/541 |

OTHER PUBLICATIONS

Frank, et al., "Reducing False Node Failure Predictions in HPC", 2019 IEEE 26$^{th}$ International Conference on High Performance Computing, Data, and Analytics (HIPC), Dec. 17, 2019; pp. 323-332.

* cited by examiner

PREDICTION OF AN ANOMALY OF A RESOURCE FOR PROGRAMMING A CHECKPOINT

This application claims priority to European Patent Application Number 22306125.0, filed 28 Jul. 2022, the specification of which is hereby incorporated herein by reference.

background of the invention The technical field of the invention is that of managing execution errors of applications on a distributed computing infrastructure.

At least one embodiment of the invention relates to a method for programming a checkpoint for an application executed on a computing infrastructure.

DESCRIPTION OF THE RELATED ART

Within a context of high-performance computing (HPC), applications are distributed and executed on a large number of computing resources of an HPC computer, which are called nodes. The execution of an application, which is often very resource-intensive, can last from a few seconds to several weeks or months on each of the nodes allocated thereto, and is not free from errors, called failures, due to a resource anomaly.

In order to avoid the loss of data and computations carried out before the failure, backup mechanisms, called "checkpoints", exist and make it possible to save, on a local or remote storage solution, all the data necessary for the application at a precise time instant in its execution, for each of the nodes. In other words, the checkpoint can be interpreted as taking an image of the state of the application at a given time instant. Thus, it is possible to restore the failing application at an advanced step by loading the saved data, rather than restarting the execution of the application from the beginning (also called "restart"). This type of mechanism is known as C/R for Checkpoint/Restart. C/R can be implemented directly in the application itself or in the operating system (OS).

The C/R mechanism is very interesting, particularly for heavy applications with a long execution time or a very large number of resources required (several hundreds or thousands of nodes). However, this mechanism has a major impact on the execution performance of the application within an HPC context. Indeed, C/R is conventionally implemented to be executed several times during the execution of the application on the node, for example at regular intervals. However, it turns out that C/R generates significant data flows, in particular for writing the state of the application to remote storage, and vice versa when restarting the application to recover the data and restore the computation. In practice, the C/R mechanism is not used very much because the advantage provided, that is, enabling the failing application to be restarted at an advanced step, is often lost because of the time required to implement the checkpoint and restore the computation, especially since a checkpoint proves to be useless if it does not result in a restoration.

Consider, for example, an application distributed over 100 nodes for a duration of 24 hours with a checkpoint mechanism triggered every hour, the application using 64 GB of memory per node. In this case, it will be necessary, in the worst case, to save 100×64 GB=6.4 TB of data every hour. The transfer and storage of such a volume of data, which is not a payload for the computation itself, thus represents a consumption of energy and bandwidth as well as an additional carbon footprint that is not necessary if the checkpoint is not used, that is, if the application is executed without failure. Furthermore, as this saving is carried out in a frequency-based manner, every hour, the data to be saved have to be read, transferred and then written each time. Conversely, when a failure occurs, the data have to be read again, transferred again and written back into memory so that the application can resume execution from the last checkpoint. This C/R mechanism, although very useful, is therefore time-consuming compared with the time required to read, write and transfer such large volumes of data. These mechanisms, which use resources attached to the computational nodes, are known as edge effects and enable execution data to be saved and a failing application to be resumed.

There is therefore a need to be able to restart an application after a failure, without the drawbacks of the state of the art, that is, with less impact on the execution performance of the distributed application.

BRIEF SUMMARY OF THE INVENTION

At least one embodiment of the invention offers a solution to the problems mentioned previously, by enabling a checkpoint to be triggered at a date corresponding to the prediction of a failure. The C/R mechanism thus becomes an event-based mechanism and no longer a frequency-based mechanism, as it has been until now.

At least one embodiment of the invention relates to a computer-implemented method for programming a checkpoint for at least one application executed on a computing infrastructure, the computing infrastructure comprising a plurality of resources allocated to the execution of the application, the method comprising the following steps of:

Determining a date of failure of the application as a function of a prediction of an anomaly of at least one resource of the plurality of resources;

Programming the checkpoint as a function of the date of failure.

By means of one or more embodiments of the invention, it is possible to implement a checkpoint mechanism whose impact on the performance of the application will be less than that of a frequency-based C/R mechanism. Indeed, the method according to at least one embodiment of the invention enables the checkpoint to be triggered only when a failure is predicted, and not systematically, for example at regular intervals. It is therefore an event-based C/R mechanism, based on an event related to a failure prediction, and not a frequency-based mechanism. Thus, by way of at least one embodiment, the C/R mechanism is advantageously less frequent while the probability of using it to restore the computation is much higher. The C/R mechanism therefore becomes useful more often and is less costly than in its frequency-based version. At least one embodiment of the invention also makes it possible to reduce the edge effects induced by the C/R mechanism.

In addition to the characteristics just discussed in the preceding paragraph, the method according to at least one embodiment of the invention can have one or more of the following additional characteristics, considered individually or according to any technically possible combinations.

In at least one embodiment, at least one resource identifier is furthermore determined at the step of determining the date of failure, each resource identifier identifying one resource of the plurality of resources causing the anomaly, and wherein the checkpoint is furthermore programmed as a function of the determined resource identifier.

By means of at least one embodiment, it is possible to identify the resource or resources responsible for the application failure and to determine whether or not the resource anomaly requires a checkpoint to be triggered. Indeed, in one or more embodiments, it is not necessary to trigger a checkpoint if the resource identified is not essential, for example because it exists in several copies on the computational node where it is located, such as two identical Ethernet ports redundantly configured.

In one or more embodiments, a prediction confidence index is furthermore determined in the step of determining the date of failure, and wherein the checkpoint is furthermore programmed as a function of the confidence index determined.

By means of at least one embodiment, it is possible to discriminate a false positive from an actual failure.

In one or more embodiments, the checkpoint is programmed to be triggered at a time instant preceding the date of failure, the time instant preceding the date of failure by at least a predetermined duration.

By means of at least one embodiment, it is possible to trigger the checkpoint shortly before the failure occurs, and then to resume computations from this checkpoint. Thus, the time interval between the checkpoint and the failure is minimal.

In one or more embodiments, the anomaly is predicted as a function of resource data collected via probes before the execution of the application.

By means of at least one embodiment, it is possible to anticipate a failure of an application that is not yet being computed. This makes it possible, for example, to delay or anticipate the execution of a critical application for which it is desired to avoid allocating resources that can be subject to fault. As a result, the checkpoint will not be necessary.

In one or more embodiments, the anomaly is predicted as a function of resource data collected via probes during the execution of the application.

By means of at least one embodiment, it is possible to continuously monitor the activity of the resources in order to predict the anomaly during the execution of the application. In particular, it is possible to use machine learning mechanisms, such as reinforcement learning for the prediction of the anomaly.

In one or more embodiments, the prediction of the anomaly is implemented by analysis of a trend of occurrences of anomalies, the analysis being a statistical analysis or a machine learning analysis.

By means of at least one embodiment, it is possible to estimate a statistical trend in the errors of one or more resources and to predict a next anomaly from the extrapolation of this trend.

In one or more embodiments, the application comprises a plurality of execution tasks and the anomaly is predicted during the execution of at least one execution task of the plurality of execution tasks.

In one or more embodiment, the checkpoint is programmed to be triggered at the end of the execution of the execution task preceding the execution task of the plurality of execution tasks during which the anomaly is predicted.

By means of one or more embodiments, it is possible to trigger the checkpoint during a precise step of the execution of the application. Preferably, in at least one embodiment, it is possible to trigger the checkpoint during the execution task preceding the execution task where the failure is predicted, in order to reduce the computational time lost by the failure. Advantageously, by way of one or more embodiments, it is possible to trigger the checkpoint during an execution task requiring the fewest execution data in order to reduce the volume of data saved and therefore to reduce the checkpoint implementation time.

In one or more embodiments, after the checkpoint is triggered, a frequency-based checkpoint is programmed to be triggered at a plurality of saving time instants.

By means of at least one embodiment, it is possible to implement a frequency-based checkpoint in the event that the failure occurs later than the predicted date. The interest is therefore to trigger the checkpoint as close as possible to the date of failure in order to reduce the computational time lost due to the failure. It is therefore a frequency-based model implemented over a much shorter period of time than the total execution time of the application.

At least one embodiment of the invention relates to a computing infrastructure that includes a plurality of resources allocated to the execution of an application, and characterized in that it includes:

A prediction module that implements the step of determining a date of failure of the application of the method according to at least one embodiment of the invention;

A programming module that implements the step of programming the checkpoint of the method according to at least one embodiment of the invention, via a checkpoint manager of the computing infrastructure, a resource manager of the computing infrastructure or the application.

In at least one embodiment, the programming module implements the programming of the frequency-based checkpoint of the method according to at least one embodiment of the invention.

At least one embodiment of the invention relates to a computer program product comprising instructions which, when the program is executed by a computer, cause the computer to implement the steps of the method according to one or more embodiments of the invention.

At least one embodiment of the invention relates to a computer-readable recording medium comprising instructions which, when executed by a computer, cause the computer to implement the steps of the method according to one or more embodiments of the invention.

The one or more embodiments of the invention and its various applications will be better understood upon reading the following description and upon examining the accompanying figures.

BRIEF DESCRIPTION OF THE DRAWINGS

The figures are set out by way of indicating and in no way limiting purposes.

DETAILED DESCRIPTION OF THE INVENTION

Unless otherwise specified, a same element appearing in different figures has a single reference.

Figure 1:
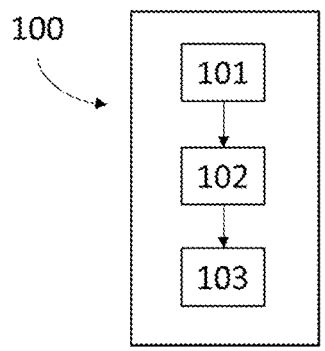
FIG. 1 is a schematic representation of the method according to one or more embodiments of the invention and of the sequence of steps that it includes.

At least one embodiment of the invention relates to a method for programming a checkpoint, implemented by a computer. FIG. 1 illustrates the sequence of steps of the method according to one or more embodiments of the invention. The method 100 includes two main steps, numbered 101 and 102, as well as an optional step numbered 103.

Figure 2:
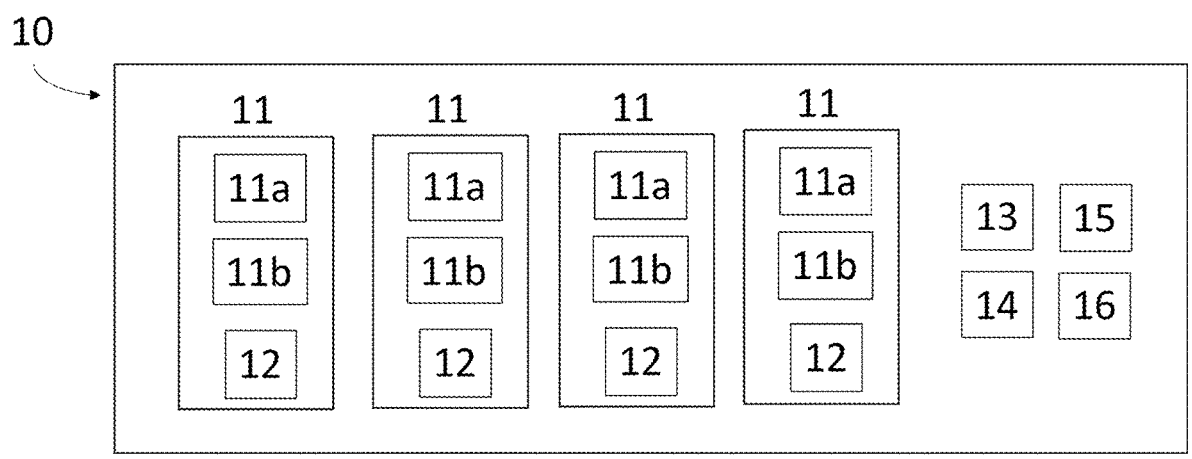
FIG. 2 is a schematic representation of a computing infrastructure according to one or more embodiments of the invention.

The checkpoint makes it possible to save execution data for at least one application 12 executed on a computing infrastructure. FIG. 2 is a diagram representing the computing infrastructure 10, according to one or more embodiments of the invention.

The computing infrastructure 10 is preferably a high-performance computing infrastructure, called HPC, comprising a plurality of resources communicating with each other via a network. The resources are gathered on one or more computational nodes 11, each adapted to execute the application 12. Each node 11 comprises, as resources, at least one processor 11a and a volatile memory 11b. It can also include other types of resources, such as a non-volatile memory, a graphics board, a wired or non-wired connection module, one or more computation accelerators, for example GPUs (Graphical Power Units), and so on. Alternatively, by way of at least one embodiment, each node 11 can be considered as one of the resources of the plurality of resources and each node 11 can itself include resources of the plurality of resources.

Within an HPC context, the application 12 to be executed is implemented on at least one node 11 or distributed on several nodes 11 of the computing infrastructure 10. Some or all of the resources of said node 11 are thus allocated to the execution of the application 12 on said node 11.

Step 101 of the method 100 is a step of determining a date of failure of the application 12, by way of at least one embodiment. By "failure of the application 12", it is meant a halt in the execution of the application 12 on one or more nodes 11 of the computing infrastructure 10. The date of failure of the application 12 is therefore the date on which the failure of application 12 occurs. Such a date can be in the form of a time stamp, for example comprising seconds, minutes, an hour, a day, a month and a year or any combination, or can be in the form of a duration from the detection of the failure of the application 12, the duration can be expressed in seconds, minutes, hours, days, months, years or any combination.

The date of failure of the application 12 is computed from a prediction of an anomaly of at least one resource of the plurality of resources allocated to the execution of the application 12, by way of at least one embodiment. By "anomaly of a resource", it is meant a malfunction of the resource, which deviates from its nominal operation, and which leads to an error during the use of said resource by an application 12 and therefore to the failure of said application 12. For example, this could be a SMART error, a network error, such as a transmission error on an InfiniBand port, or a memory read and/or write error. The failure can be a partial or total failure of a component, for example caused by overheating of said component, or related to another cause not listed here.

Preferably, by way of at least one embodiment, the date of failure is estimated by means of a resource anomaly prediction program, from operation data of the resources of the plurality of resources allocated to the execution of the application 12. In particular, in one or more embodiments, the prediction program is configured to collect the operation data of the resources during normal operation phases, that is, without resource anomaly, and during abnormal operation phases, that is, with resource anomaly. These data are collected by means of probes placed on the computing infrastructure 10. They can be software probes, for example to measure a data flow, a processor computational speed, a memory read and/or write speed, a memory saturation rate, etc. They can be hardware probes, for example to measure a processor temperature, a water flow rate in the cooling system in a node 11, etc. The prediction program is for example the ATOS Cognitive Data Center™ program or the IBM Watson™ program.

The prediction program determines, in at least one embodiment, based on the resource data collected, an anomaly date, which is a date on which the occurrence of the resource anomaly is predicted. Preferably, the date of failure is the anomaly date.

Resource data collection by means of the probes, in one or more embodiments, is performed during the execution of the application 12 and/or before the execution of the application 12, for example during the execution of other applications 12. The interest of collecting resource data before the execution of the application 12 is to collect resource data during abnormal operation phases. These data are thus associated with resource anomalies and is thus analyzed to determine trends of occurrences of the resource anomaly. The collection can also relate to one or more event logs and/or performance indices such as Reliability, Availability and Serviceability (RAS) indices. The collection can be implemented by means of a collection program such as Prometheus™ or Elasticsearch™. Furthermore, by way of at least one embodiment, the collection can be implemented through a Simple Network Management Protocol (SNMP).

The resource data collected are stored on a data storage memory 15, which is a non-volatile memory. The data storage memory can be included in the computing infrastructure 10 or can be external to the computing infrastructure 10, by way of at least one embodiment.

In other words, in one or more embodiments, the prediction program is used to determine behavior patterns of the resources that are characteristic of the malfunction of said resources. Detection of such behavior patterns in the resource data enables a future resource anomaly to be predicted.

The prediction of the resource anomaly, in one or more embodiments, is implemented by means of a predictive algorithm, for example based on statistical or machine learning tools, such as deep learning or reinforcement learning. The advantage of using reinforcement learning is to enable the detection of as yet unlearned behavior patterns in previously collected resource data.

The prediction program is therefore configured to predict the future failure if the data collected by the probes before the execution of the application 12 indicates a trend of occurrence of the anomaly, by way of at least one embodiment.

Advantageously, in one or more embodiments, the prediction program is also configured to analyze the resource data collected during the execution of the application 12. The prediction program therefore performs continuous monitoring of the operation of the resources in order to detect the trend of occurrence of the anomaly in this continuously collected data. Preferably, by way of at least one embodiment, the detection of the trend of occurrence of the anomaly in the data collected during the execution of the application 12 is implemented by means of the predictive algorithm.

Accordingly, in one or more embodiments, when the prediction program detects the trend of occurrence of the resource anomaly, it determines the date of failure as a function of the previous occurrences of the resource anomaly.

Alternatively, in one or more embodiments, the date of failure is determined as a function of a number of anomalies of a resource. Indeed, a single anomaly does not necessarily cause a failure in the application 12. In some cases, in at least one embodiment, it is an accumulation of anomalies that leads to said failure of the application 12. In this case, by way of one or more embodiments, the prediction program is adapted to detect in the resource data the number of anomalies at which the failure will occur. Furthermore, in at least one embodiment, the number of anomalies can increase during the use of the resource. In this case, in one or more embodiments, the prediction program can inform of the future failure of the application 12 by predicting the time course of the number of anomalies by the predictive algorithm. Advantageously, by way of at least one embodiment, the prediction program can take account of the number of anomalies and predict the date of failure by an analysis and prediction of the time course of the number of anomalies.

Data collection is implemented on at least one of the resources of the plurality of resources allocated to the execution of the application 12. Similarly, in one or more embodiments, the analysis of the data collected can be implemented on at least one of the resources of the plurality of resources allocated to the execution of the application 12. Accordingly, in at least one embodiment, the resource anomaly is predicted for at least one of the resources of the plurality of resources allocated to the execution of the application 12. The estimation of the date of failure can therefore be implemented from the prediction of the anomaly of at least one of the plurality of resources allocated to the execution of the application 12.

Step 102 is then a step of programming the checkpoint. The checkpoint is programmed to be triggered at a time instant that depends on a saving date, preferably before the date of failure. In particular, by way of at least one embodiment, the trigger time instant of the checkpoint can be a time instant preceding the date of failure. For example, in one or more embodiments, the time instant preceding the date of failure precedes the date of failure by at least a predetermined duration. The predetermined duration depends on one or more factors such as the execution duration of the application 12 or the criticality of the data obtained by the application 12. For example, in one or more embodiments, the predetermined duration can be between 1 minute and 10 hours, as a function of the application. Furthermore, by way of at least one embodiment, the predetermined duration can be defined so as to take account of the time required to execute the checkpoint before failure. For example, in at least one embodiment, if the time required to execute the checkpoint is 2 hours, then the predetermined duration is at least greater than 2 hours.

Advantageously, in one or more embodiments, the volume of resource data can be known at several execution time instants of the application 12. For example, in at least one embodiment, the volume of resource data can have been determined during a prior execution of the application 12 during which the volume of resource data necessary for its execution has been quantified at several execution time instants, for example by means of probes. Alternatively, in one or more embodiments, the volume of resource data can be estimated by the operator, by a user of the application 12 or by means of automatic computation adapted to estimate the volume of resource data. Thus, the trigger time instant can be chosen so as to minimize the volume of data saved during the checkpoint. For example, the trigger time instant can be one of the execution time instants of the application 12, before the date of failure, whose volume of resource data is minimal. The interest is to minimize the impact of the C/R mechanism on computational performance.

The checkpoint can be a full checkpoint or a partial checkpoint.

By "full checkpoint", it is meant a checkpoint used to save, to a remote or local dedicated memory, all the data which are used by the application 12 at the trigger time instant and which is stored in a volatile and/or non-volatile memory of the node 11. A state of all of the processes of the application 12 being executed at the trigger time instant is also saved. The interest of the full checkpoint is that its triggering is transparent for the node 11 and/or for a virtual machine accommodating the execution of the application 12 on the node 11, since carrying out the checkpoint is here independent of the application 12 being executed. When the computation is restored, in at least one embodiment, when restarting the application 12, all the data used by the application 12 is written back to the temporary memory of the node 11 and the processes of the application 12 are restored to the state they were in at the trigger time instant of the checkpoint. The checkpoint is, for example, implemented by a checkpoint program, such as the DMTCP™ (Distributed MultiThreaded CheckPointing) program or the CRIU™ (Checkpoint/Restore In Userspace) program. The checkpoint program, for triggering the checkpoint, then receives the trigger time instant in order to program the checkpoint. It can also receive the date of failure.

By "partial checkpoint", it is meant a checkpoint used to save only a part of the data which are used by the application 12 at the trigger time instant and which is stored in a volatile and/or non-volatile memory of the node 11. Generally speaking, by way of one or more embodiments, the part of the data saved corresponds to a fraction of 10% of the volume of data in the temporary memory. This fraction of volume of data can possibly be larger or smaller, as a function of the application 12 concerned, and can, for example, be between 5% and 50% of the volume of data in memory. The interest of the partial checkpoint is that only a small volume of data needs to be saved, and therefore restored. However, this type of C/R mechanism has to be native to the application 12 being executed, which therefore comprises instructions dedicated to triggering the checkpoint and restoring the computation. This also implies that the application 12 is aware of which data is essential for it to restart and which is not.

Advantageously, by way of at least one embodiment, the prediction program provides a confidence index regarding the predicted date of failure. Indeed, the prediction of the date of failure is not certain because it is associated with a probability of the failure occurring. The confidence index therefore indicates the reliability of the date of failure to take account of the probability of the failure occurring. The confidence index is for example a percentage for which, the higher the value, the greater the reliability of the prediction.

The checkpoint can thus be programmed as a function of the confidence index. Preferably, in one or more embodiments, the checkpoint is programmed if the confidence index exceeds a predefined threshold. The interest is, among other things, that the checkpoint is not programmed for a false positive of a predicted resource anomaly. This threshold can be predefined as a function of the context within which the application 12 is executed, for example if it is a test, deployment or production context, the threshold is predefined as a function of the professional knowledge and/or experience of the operator. When this threshold is predefined, by way of at least one embodiment, it is stored in a memory of a node 11 executing the application 12, of a node 11 executing the prediction program, of a checkpoint manager 13, of a resource manager 14, or in a remote memory. By way of example, in one or more embodiments, to greatly reduce the impact of the C/R mechanism on computational performance, the predefined threshold can be 90%, which corresponds to a 90% probability of occurrence of the resource anomaly. Alternatively, by way of at least one embodiment, a predefined threshold of 70%, corresponding to a 70% probability of occurrence of the resource anomaly, makes it possible to minimize the risks of losing the computation in progress and to ensure that the application 12 has a checkpoint for restarting.

In some cases, by way of one or more embodiments, the probability of a resource anomaly increases with time, for example as a function of continuously collected resource data. The interest of the confidence index is thus to enable the checkpoint to be programmed when the probability of occurrence of the resource anomaly is sufficiently high and thus to avoid unnecessary checkpoints.

Advantageously, by way of at least one embodiment, the prediction program provides at least one resource identifier each corresponding to a resource for which the anomaly is predicted. The interest is to know the nature of the resource which is malfunctioning, and possibly the nature of the anomaly of said resource.

The checkpoint can thus be programmed as a function of said identifier, especially as a function of the nature of the malfunctioning resource and/or the nature of the resource anomaly. Indeed, by way of at least one embodiment, it is not because the resource malfunctions that it will cause the failure. In some cases, the resource anomaly relates to a resource which is not used by the application 12 and will not cause failure; for example a graphics board whereas the application 12 only uses the processor 11a and the temporary memory 11b. In other cases, the nature of the resource anomaly will not cause the failure of the application 12; for example, a processor that overheats and whose computational frequency decreases by 5% during the execution of the application 12 will only reduce the computational performance. Finally, in other cases, the resource anomaly relates to a redundant resource, that is, a resource which is available on the node 11 in several copies, possibly identical; for example, the malfunctioning of an Ethernet port, used by the application 12, and existing in two copies on the node 11 will not cause the failure of the application 12 since the application 12 will be able to switch to the second Ethernet port.

In this case, by way of at least one embodiment, a list of resources is available and lists all the resources of the computing infrastructure 10. The list of resources is, for example, produced by means of the resource manager 14. Furthermore, in one or more embodiments, a list of rules is available for each application 12. These rules in the list of rules indicate one or more conditions on each resource in order to define whether the resource in question is essential or non-essential for the execution of the application 12 on the node 11 comprising said resource. If it is essential, then the anomaly of that resource will cause the failure of the application 12. If it is non-essential, then the anomaly of the resource will not cause the failure of the application 12. For example, in at least one embodiment, if the application 12 requires an Ethernet port to operate and the node 11 executing the application 12 comprises two Ethernet ports, then the "Ethernet port" resource will be defined as non-essential on this node 11 and for this application 12, since the second Ethernet port can be transparently substituted for the first Ethernet port. On the other hand, if the application 12 requires a graphics board and the node 11 comprises only one graphics board, then the "graphics board" resource will be defined as essential on this node 11 and for this application 12. The list of resources and the list of rules are, for example, stored on a non-volatile memory of the resource manager 14 or on the data storage memory 15.

The identifier therefore makes it possible to determine whether the predicted resource anomaly will cause the failure of the application 12, in which case the checkpoint is programmed. Conversely, if the predicted resource anomaly will not cause the failure of the application 12, the checkpoint is not programmed.

Moreover, by way of at least one embodiment, the application 12 can comprise a plurality of execution tasks. Thus, the application 12 is executed according to a workflow instructing the sequential execution, on the allocated nodes 11, of the application 12 according to the plurality of execution tasks. In this case, by way of one or more embodiments, the prediction program is adapted to determine a failure execution task, during the execution of which the resource anomaly is predicted. The date of failure thus corresponds to a time instant during the execution of the failure execution task.

The checkpoint can then be programmed as a function of the failure execution task. More particularly, in at least one embodiment, the checkpoint can be programmed so as to be triggered before the failure execution task. Preferably, in one or more embodiments, the checkpoint is programmed to be triggered at the execution task that precedes, in the workflow, the failure execution task. For example, the checkpoint can be triggered at the beginning, during or at the end of the execution task preceding the failure execution task. Once again, the interest is to minimize the impact of the checkpoint on computational performance, especially by ensuring that the lost computational time is minimal.

Alternatively, by way of at least one embodiment, the computation point can be programmed during an execution task for which the volume of execution data to be saved during the checkpoint is less than the volume of execution data to be saved for the execution task preceding the failure execution task. The interest is to minimize the cost of the checkpoint and its impact on computational performance.

Optional step 103 is a step of programming a plurality of frequency-based checkpoints, each triggered at a saving time instant of a plurality of saving time instants. Each frequency-based checkpoint is implemented at a time instant subsequent to the triggering of the checkpoint programmed in step 102. The plurality of frequency-based checkpoints is implemented when the failure of the application 12 has not occurred by the predicted date of failure. Such frequency-based checkpoints ensure that a checkpoint has been triggered as close as possible to the failure of the application 12, which makes it possible to reduce the computational time lost by the failure.

Programming the plurality of frequency-based checkpoints then consists in programming the frequency-based checkpoints from the time instant subsequent to the checkpoint programmed in step 102. The subsequent time instant can occur after a duration of between 1 minute and 10 hours after the triggering of the programmed checkpoint, for example after 30 minutes. The frequency-based checkpoints are programmed so that they are triggered successively, respecting a trigger interval.

Advantageously, by way of at least one embodiment, this duration can be adapted to the application 12 being executed and/or to the confidence index and/or to the resource identifier. Indeed, in one or more embodiments, the duration can be short if the confidence index is high, for example less than 30 minutes if the confidence index is greater than 95%, or long if the confidence index is not high, for example greater than 30 minutes if the confidence index is less than 80%.

Moreover, in at least one embodiment, the duration can be short, for example less than 30 minutes, if the identifier indicates that the resource anomaly relates to a resource that is critical to the execution of the application 12; conversely, the duration can be long, for example greater than 30 minutes, if the resource concerned is not critical. For example, in the case of an application 12 executing on a processor from data received via an Ethernet port and stored on a random-access memory, if the identifier indicates that the resource anomaly relates to the Ethernet port then it is not a critical resource and the duration can be long, for example greater than 30 minutes; indeed, the halt of the Ethernet port prevents the execution of computations but the computation data and the state of the processor are retained. On the other hand, if the resource anomaly relates to the supply to the node 11, then this is a critical resource and the duration can be short, for example less than 30 minutes.

In the same way as for the duration, the trigger interval for triggering successive frequency-based checkpoints can be adapted to the current application 12, to the confidence index and/or to the resource identifier. Alternatively, by way of at least one embodiment, the trigger interval can be different from the duration. Furthermore, the trigger interval can be a regular interval.

In one or more embodiments, the trigger interval is not a regular interval. For example, the frequency for triggering successive frequency-based checkpoints can be increased or decreased after each frequency-based checkpoint is triggered. Moreover, the trigger interval can follow a law predefined by the operator, as a function of the current application 12, the confidence index, the resource identifier and/or on the basis of the operator's professional knowledge.

Alternatively, by way of at least one embodiment, the programming of the plurality of frequency-based checkpoints is implemented so that at least one of the frequency-based checkpoints is triggered at each of the execution tasks subsequent to the execution task at which the checkpoint has been triggered. For example, at least one of the frequency-based checkpoints can be triggered at the beginning, during, or at the end of each of the execution tasks subsequent to the execution task at which the checkpoint has been triggered.

Step 101 of determining the date of failure of the application according to one or more embodiments of the method 100 is implemented by a prediction module 16. The prediction module 16 is thus adapted to implement step 101 of the method 100, in which case the prediction module 16 comprises instructions which, when executed by a processor, lead to the implementation of step 101. The prediction module 16 can furthermore be adapted to implement the prediction program. The prediction module 16 can then comprise instructions which, when executed by a processor, lead to the implementation of the prediction program. The prediction module 16 can also comprise a processor and a volatile memory.

The prediction module 16 can be included in the computing infrastructure 10, in the checkpoint manager 13 or in the resource manager 14. Alternatively, by way of at least one embodiment, the prediction module can be external to the computing infrastructure.

Step 102 of programming the checkpoint according to one or more embodiments of the method 100 is implemented by a programming module. This programming module is thus adapted to implement step 102 of the method 100. In this case, by way of at least one embodiment, the programming module comprises instructions which, when executed by a processor, lead to the implementation of step 102. In the same way, in least one embodiment, the programming module can be adapted to implement step 103 of programming a plurality of frequency-based checkpoints according to one or more embodiments of the method 100, and comprise instructions which, when executed by a processor, lead to the implementation of step 103.

The programming module implements step 102 and step 103 via the checkpoint manager 13, the resource manager 14 or the application 12. The programming module can be included in the computing infrastructure 10 or can be external to the computing infrastructure 10.

The checkpoint manager 13 is configured to implement checkpoints, that is, to initiate backups and to ensure that a checkpoint is actually programmed and that a saving is actually performed.

The resource manager 14 is configured to monitor the operation of the resources of the computing infrastructure 10 by collecting resource data, for example by means of probes, and to warn of the detection of a resource anomaly. Advantageously, by way of at least one embodiment, the resource manager 14 can inform the operator of the predicted anomaly by indicating the resource identified, and optionally the date of the anomaly. The operator can then decide to implement a maintenance operation, for example to repair or replace the resource, in order to prevent the anomaly.

When the programming module resorts to the application 12, the application 12 contains instructions which, when executed by a processor, enable the implementation of step 102. For this, in one or more embodiments, the application can comprise a handler, which listens for a signal notifying the application to program a checkpoint. Similarly, by way of at least one embodiment, the application 12 can be configured to implement step 103 of the method 100, for example because it comprises instructions which, when executed by a processor, lead to the implementation of step 103.

The prediction module 16, the checkpoint manager 13, the resource manager 14 and the computational nodes 11 communicate with each other via the network, and thus each comprise one or more communication means such as a wired or non-wired connection module.

The invention claimed is:

1. A computer-implemented method for programming a checkpoint of at least one application executed on a computing infrastructure, the computing infrastructure comprising a plurality of resources allocated to execution of the at least one application, wherein the computer-implemented method comprises:
    determining a date of failure of the at least one application as a function of a prediction of an anomaly of at least one resource of the plurality of resources;
    programming the checkpoint as a function of the date of failure.

2. The computer-implemented method according to claim 1, wherein said determining the date of failure comprises determining at least one resource identifier, wherein each resource identifier of the at least one resource identifier identifies one resource of the plurality of resources causing the anomaly, and wherein the checkpoint is furthermore programmed as a function of the at least one resource identifier that is determined.

3. The computer-implemented method according to claim 1, wherein said determining the date of failure comprises determining a prediction confidence index, and wherein the checkpoint is furthermore programmed as a function of the prediction confidence index that is determined.

4. The computer-implemented method according to claim 1, wherein the checkpoint is programmed to be triggered at a time instant preceding the date of failure, the time instant preceding the date of failure by at least a predetermined duration.

5. The computer-implemented method according to claim 1, wherein the anomaly is predicted as a function of resource data collected via probes before the execution of the at least one application.

6. The computer-implemented method according to claim 1, wherein the anomaly is predicted as a function of resource data collected via probes during the execution of the at least one application.

7. The computer-implemented method according to claim 1, wherein the prediction of the anomaly is implemented by an analysis of a trend of occurrences of anomalies, the analysis being a statistical analysis or a machine learning analysis.

8. The computer-implemented method according to claim 1, wherein the at least one application comprises a plurality of execution tasks and the anomaly is predicted during execution of at least one execution task of the plurality of execution tasks.

9. The computer-implemented method according to claim 8, wherein the checkpoint is programmed to be triggered at an end of the execution of an execution task preceding the at least one execution task of the plurality of execution tasks during which the anomaly is predicted.

10. The computer-implemented method according to claim 1, wherein the checkpoint is programmed to be triggered such that, after the checkpoint is triggered, a frequency-based checkpoint is programmed to be triggered at a plurality of saving time instants.

11. A computing infrastructure comprising: a plurality of resources allocated to execution of an application, a prediction module configured to determine a date of failure of the application as a function of a prediction of an anomaly of at least one resource of the plurality of resources, wherein said application comprises a checkpoint; a programming module at least configured to program the checkpoint as a function of the date of failure, via a checkpoint manager of the computing infrastructure, a resource manager of the computing infrastructure, or the application.

12. The computing infrastructure according to claim 11, wherein the programming module is further configured to program a frequency-based checkpoint to be triggered at a plurality of saving time instants.

13. A non-transitory computer product comprising instructions which, when is executed by a computer, cause the computer to implement a method for programming a checkpoint of at least one application executed on a computing infrastructure, the computing infrastructure comprising a plurality of resources allocated to execution of the at least one application, wherein the method comprises:
  determining a date of failure of the at least one application as a function of a prediction of an anomaly of at least one resource of the plurality of resources;
  programming the checkpoint as a function of the date of failure.

14. The non-transitory computer product of claim 13, wherein said non-transitory computer product comprises a non-transitory computer-readable recording medium.

15. The non-transitory computer product of claim 13, wherein said non-transitory computer product comprises a program.

* * * * *